US011076009B2

(12) United States Patent
Gupta et al.

(10) Patent No.: US 11,076,009 B2
(45) Date of Patent: Jul. 27, 2021

(54) ANTI-JITTER MECHANISM FOR MONITORING ONLINE AVAILABILITY

(71) Applicant: Microsoft Technology Licensing, LLC, Redmond, WA (US)

(72) Inventors: Akhilesh Gupta, Mountain View, CA (US); Meng Ly Lay, Fremont, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 24 days.

(21) Appl. No.: 15/959,468

(22) Filed: Apr. 23, 2018

(65) Prior Publication Data

US 2019/0327319 A1   Oct. 24, 2019

(51) Int. Cl.
*G06F 15/173* (2006.01)
*H04L 29/08* (2006.01)
(Continued)

(52) U.S. Cl.
CPC .............. *H04L 67/24* (2013.01); *H04L 43/10* (2013.01); *H04L 51/04* (2013.01)

(58) Field of Classification Search
CPC .......... H04L 67/24; H04L 42/10; H04L 51/04
(Continued)

(56) References Cited

U.S. PATENT DOCUMENTS 8,462,212 B1 * 6/2013 Kundu ................. G07G 1/0081
348/150
2012/0089845 A1   4/2012 Raleigh
(Continued)

FOREIGN PATENT DOCUMENTS

EP   2775755 A1   9/2014

OTHER PUBLICATIONS

Auradkar, Aditya, "Introducing Expresso Linkedin's hot new distributed document store", LinkedIn, [Online]. Retrieved from the Internet: <URL: https://engineering.linkedin.com/espresso/introducing-espresso-linkedins-hot-new-distributed-document-store>, (Jan. 21, 2015), 13 pgs.

(Continued)

*Primary Examiner* — Dustin Nguyen
*Assistant Examiner* — Joel Mesa
(74) *Attorney, Agent, or Firm* — Schwegman Lundberg & Woessner, P.A.

(57) ABSTRACT

A system is configured to determine whether a member of a social networking service is online or offline with the social networking service. The system updates the online or offline status of the member in accordance with whether the member is connected to the social networking service. The system further implements an anti-jitter mechanism that prevents a waste of computing resources where the member is connected to the social networking service using an intermittent connection. The anti-jitter mechanism leverages heartbeat messages and timestamps to determine whether the member is online or offline with the social networking service. The anti-jitter mechanism further includes the use of one or more delay triggers, where each delay trigger may be generated based on a received heartbeat message. As the status of the member changes, the social networking service disseminates the status change to other members communicatively coupled to the social networking service.

14 Claims, 6 Drawing Sheets

(51) Int. Cl.
*H04L 12/26* (2006.01)
*H04L 12/58* (2006.01)

(58) Field of Classification Search
USPC .......................................................... 709/224
See application file for complete search history.

(56) References Cited

U.S. PATENT DOCUMENTS

| | | | |
|---|---|---|---|
| 2014/0108497 A1* | 4/2014 | Yao .................. | H04N 21/85406 |
| | | | 709/203 |
| 2015/0067155 A1* | 3/2015 | Sanders ................ | H04L 67/143 |
| | | | 709/224 |
| 2017/0061549 A1 | 5/2017 | Vasthimal et al. | |
| 2018/0006976 A1 | 1/2018 | Ye et al. | |
| 2019/0107832 A1* | 4/2019 | Strand ................ | G05B 23/0272 |

OTHER PUBLICATIONS

"International Search Report and Written Opinion Issued in PCT Application No. PCT/US2019/026215", dated Jun. 21, 2019, 12 Pages.

\* cited by examiner

ANTI-JITTER MECHANISM FOR MONITORING ONLINE AVAILABILITY

TECHNICAL FIELD

The subject matter disclosed herein generally relates to determining a user's online availability for an instant messaging conversation and, in particular, to an anti-jitter mechanism that reduces server workload in determining whether the user is available online for the instant messaging conversation.

BACKGROUND

As social networking platforms have become robust, they have become a hub for members to engage in different activities. One of the activities that a social networking platform may provide is instant messaging between members of a social network. Typically, instant messaging is an exchange of near real-time messages through a stand-alone application, embedded software, a web site, or other software and/or hardware implementations. An instant messaging session usually occurs between two users in a private, back-and-forth style of communication. However, some instant messaging sessions may include more than two users.

As mobile devices have become an increasing prevalent mode of communication, members of a social networking service may engage in instant messaging sessions using these devices. One of the features provided by an instant messaging application is the ability to know whether a particular member of the social networking service is available for an instant messaging session. The status of the member is sometimes shown as "online," "available," "offline," "in a meeting," and so forth. Knowing a member's status can be helpful because, if the member is away, offline, or otherwise unavailable, another member knows not to expect an immediate reply from the unavailable member.

However, with mobile devices, a member using the mobile device may have an intermittent connection with the social networking service that provides the instant messaging sessions. With an intermittent connection, the member may connect, disconnect, and re-connect to the social networking service at a relative high frequency (e.g., a disconnection and reconnection at 10 second intervals). This intermittent connection can put a non-trivial amount of strain on backend servers that provide the instant messaging sessions because the backend servers are programmed to notify other members of the status of the member with the intermittent connection, even if the member goes "offline" or "online" with rapid frequency. When this scenario is scaled to hundreds or thousands of members with intermittent connections, the strain placed on backend servers required to provide status notifications can exceed the available computing resources.

BRIEF DESCRIPTION OF THE DRAWINGS

Some embodiments are illustrated by way of example and not limitation in the figures of the accompanying drawings.

FIG. 1 is a block diagram illustrating a networked system, according to some example embodiments, including a social networking architecture.

FIG. 2 illustrates the social networking architecture of FIG. 1, according to an example embodiment.

FIG. 3 illustrates a processing diagram, in accordance with an example embodiment, of the various application(s) and/or platform(s), shown in FIG. 2, processing one or more messages received from a client device.

FIGS. 4A-4B illustrate a method, in accordance with an example embodiment, for publishing notifications as to whether a member of a social networking service is online or offline.

FIG. 5 is a block diagram illustrating components of a machine, according to some example embodiments, able to read instructions from a machine-readable medium (e.g., a machine-readable storage medium or machine-readable storage device) and perform any one or more of the methodologies discussed herein.

DETAILED DESCRIPTION

Example systems and methods are directed to monitoring and determining whether a member of a social networking service is online or offline for an instant messaging session. In particular, the disclosed systems and methods are directed to an anti-jitter mechanism that addresses the problem of client devices failing to maintain a consistent connection to the social networking service and/or instant messaging session. As client devices have become more portable (e.g., as cellphones, smart phones, convertible tablets, etc.), these client devices often use an over-the-air (OTA) connection (e.g., a Global Systems for Mobile Communications (GSM) connection, a Long Term Evolution (LTE) connection, a Code Division Multiple Access (CDMA) connection, etc.) for browsing the Internet, accessing the social networking service, and/or engaging in one or more instant messaging sessions.

However, these OTA connections are not always stable or consistent, and the client device that is connected to the Internet using the OTA connection may experience multiple dropped connections within a short period of time. Thus, where the member of the social networking service using the client device is logged into the social networking service and/or engaged in one or more instant messaging sessions, the online status and/or availability of the member may change in accordance with the connection state of the mobile device. Operating under normal conditions, the social networking service will attempt to update other members of the social networking service as to the real-time status of the intermittently connected member—even if the status of that member is in a constant state of flux. In this way, the social networking service wastes computing resources in updating other members of the social networking service as to the online availability of the intermittently connected member. This problem becomes exponentially exacerbated when hundreds or thousands of members connected to the social networking service experience intermittent connections; instead of wasting a small amount of computing resources for one member, the social networking service spends a non-trivial amount of computing resources in attempting to update the online status of these intermittently connected members.

The disclosed anti-jitter techniques and methods address this problem by implementing a "heartbeat" message and detection algorithm. In this context, the term "heartbeat" is used to refer to a message or communication that is repeatedly sent at known (or predetermined) time intervals. In other words, a heartbeat message is a message sent from an originator to a destination that enables the destination to identify if and when the originator fails or is no longer available. Furthermore, the disclosed social networking architecture implements a delay in determining whether a client device has failed to deliver a heartbeat message. By implementing a delay, the social networking architecture ensures that the status of the client device delivering the heartbeat messages is not inadvertently set to an offline status. Furthermore, the delay ensures that, even if the client device should go offline in-between heartbeat messages, the social networking architecture does not waste computing resources switching the client device from an online status, to an offline status, and back again. The social networking architecture may also implement other triggering characteristics, such as time threshold and/or a delay threshold to ensure that the client device in communication with the social networking architecture is not inadvertently set to an offline status. In this way, this disclosure provides a technical solution in the form of a social networking architecture that implements messages and triggers to address a problem arising within the technical field of networked communications.

Figure 1:
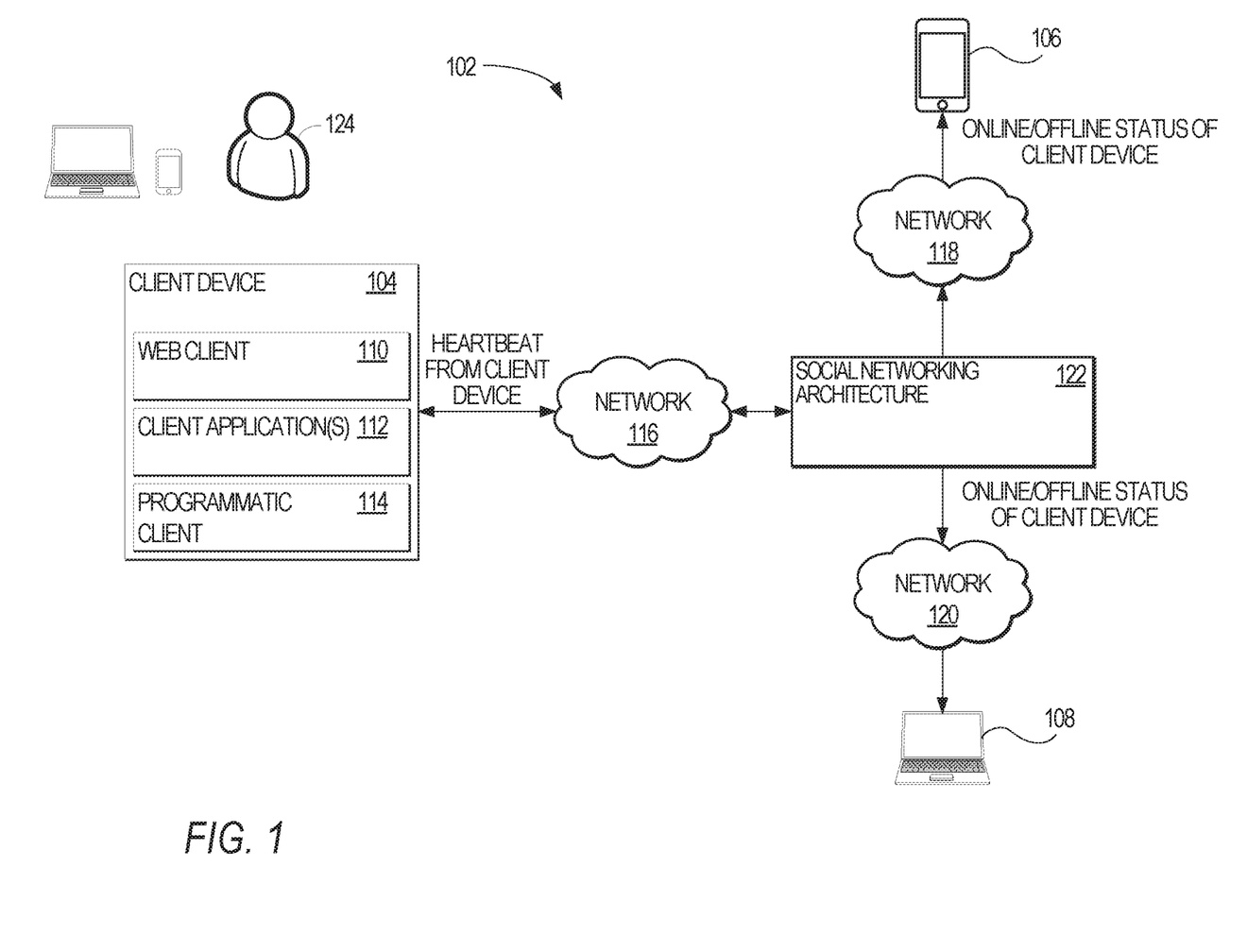

With reference to FIG. 1, an example embodiment of a high-level client-server-based network architecture 102 is shown. A social networking architecture 122 provides server-side functionality via networks 116-120 (e.g., the Internet or wide area network (WAN)) to one or more client devices 104-108. FIG. 1 illustrates, for example, a web client 110 (e.g., a browser, such as the Internet Explorer® browser developed by Microsoft® Corporation of Redmond, Wash. State), client application(s) 112, and a programmatic client 114 executing on client device 104. The social networking server 122 is further communicatively coupled with other client devices 106-108, which may include similar applications and/or programs as the client device 104.

The client device 104 may comprise, but is not limited to, a mobile phone, desktop computer, laptop, portable digital assistant (PDA), smart phone, tablet, ultra book, netbook, laptop, multi-processor system, microprocessor-based or programmable consumer electronic, or any other communication device that a user 126 may utilize to access the social networking architecture 122. In some embodiments, the client device 104 may comprise a display module (not shown) to display information (e.g., in the form of user interfaces). In further embodiments, the client device 104 may comprise one or more of touch screens, accelerometers, gyroscopes, cameras, microphones, global positioning system (GPS) devices, and so forth. The client device 104 may be a device of a user 126 that is used to perform one or more searches for user profiles accessible to, or maintained by, the social networking architecture 122.

In one embodiment, the social networking architecture 122 is a network-based appliance that responds to requests to establish one or more instant messaging sessions among the client device 104-108. One or more users 124 may be a person, a machine, or other means of interacting with the client device 104. In various embodiments, the user 124 is not part of the network architecture 102, but may interact with the network architecture 102 via the client device 104 or another means. For example, one or more portions of the networks 116-120 may be an ad hoc network, an intranet, an extranet, a virtual private network (VPN), a local area network (LAN), a wireless LAN (WLAN), a WAN, a wireless WAN (WWAN), a metropolitan area network (MAN), a portion of the Internet, a portion of the Public Switched Telephone Network (PSTN), a cellular telephone network, a wireless network, a WiFi network, a WiMax network, another type of network, or a combination of two or more such networks.

The client device 104 may include one or more applications (also referred to as "apps") such as, but not limited to, a web browser, messaging application, electronic mail (email) application, a social networking access client, and the like. In some embodiments, if the social networking access client is included in the client device 104, then this application is configured to locally provide the user interface and at least some of the functionalities with the application configured to communicate with the social networking architecture 122, on an as needed basis, for data and/or processing capabilities not locally available (e.g., access to a member profile, to authenticate a user 126, to identify or locate other connected members, etc.). Conversely if the social networking access client is not included in the client device 104, the client device 104 may use its web browser to access the services provided by the social networking architecture 122.

One or more users 126 may be a person, a machine, or other means of interacting with the client device 104. In example embodiments, the user 126 is not part of the network architecture 102, but may interact with the network architecture 102 via the client device 104 or other means. For instance, the user 126 provides input (e.g., touch screen input or alphanumeric input) to the client device 104 and the input is communicated to the client-server-based network architecture 102 via the network 116. In this instance, the social networking architecture 122, in response to receiving the input from the user 126, communicates information to the client device 104 via the network 116 to be presented to the user 126. In this way, the user 126 can interact with the social networking architecture 122 using the client device 104.

The user 126 may use the client device 104 to establish one or more communication sessions with other members of the social networking service via the social networking architecture 122. Accordingly, the client device 104 may establish one or more connections with the social networking architecture 122 to engage in these communication sessions. In establishing a connection with the social networking architecture 122, the client device 104 may communicate one or more messages to the social networking architecture 122 confirming that the client device 104 is in communication with the social networking architecture 122. These messages, referred herein as "heartbeat messages," allow the social networking architecture 122 to make a determination as to whether the client device 104 is connected with the social networking architecture 122 or whether the client device 104 has lost its connection with the social networking architecture 122.

When the client device 104 initially connects with the social networking architecture 122, the social networking architecture 122 may receive one or more heartbeat messages from the client device 104. As discussed below with reference to FIG. 2, the social networking architecture 122 may monitor the heartbeat messages at predetermined time intervals in determining whether the client device 104 is in communication with the social networking architecture 122. Should the client device 104 fail to deliver a heartbeat message within the predetermined time interval, the social networking architecture 122 may determine that the client device 104 is no longer in communication with the social networking architecture 122. Accordingly, the social networking architecture Further, while the client-server-based network architecture 102 shown in FIG. 1 employs a client-server architecture, the present subject matter is of course not limited to such an architecture, and could equally well find application in a distributed, or peer-to-peer, architecture system, for example.

Users of the client devices 104-108 may each be members of the social networking service provided by the social networking architecture 122. For example, the social networking architecture 122 may maintain one or more member profile databases storing corresponding member profiles for the members of the social networking service. In general, a member may include an individual person or an organization, such as a company, a corporation, a nonprofit organization, an educational institution, or other such organizations.

Consistent with some embodiments, when a person initially registers to become a member of the social networking service provided by the social networking architecture 122, the person is prompted to provide some personal information, such as his or her name, age (e.g., birthdate), gender, interests, contact information, home town, address, the names of the member's spouse and/or family members, educational background (e.g., schools, majors, matriculation and/or graduation dates, etc.), employment history, skills, professional organizations, and so on.

Similarly, when a representative of an organization initially registers the organization with the social networking service provided by the social networking architecture 122, the representative may be prompted to provide certain information about the organization. With some embodiments, the profile data may be processed (e.g., in the background or offline) to generate various derived profile data. For example, if a member has provided information about various job titles the member has held with the same company or different companies, and for how long, this information can be used to infer or derive a member profile attribute indicating the member's overall seniority level, or seniority level within a particular company. With some embodiments, importing or otherwise accessing data from one or more externally hosted data sources may enhance profile data for both members and organizations. For instance, with companies in particular, financial data may be imported from one or more external data sources, and made part of a company's profile.

Members of the social networking service may establish connections with one or more members and/or organizations of the social networking service. The connections may be defined as a social graph, where the member and/or organization is represented by a vertex in the social graph and the edges identify connections between vertices. In this regard, the edges may be bilateral (e.g., two members and/or organizations have agreed to form a connection), unilateral (e.g., one member has agreed to form a connection with another member), or combinations thereof. In this manner, members are said to be first-degree connections where a single edge connects the vertices representing the members; otherwise, members are said to be "nth"-degree connections where "n" is defined as the number of edges separating two vertices. As an example, two members are said to be "2nd-degree" connections where each member shares a connection in common with the other member, but the members are not directly connected to one another.

Although the foregoing discussion refers to "social graph" in the singular, one of ordinary skill in the art will recognize that the social networking architecture 122 may be configured to store multiple social graphs. For example, and without limitation, the social networking architecture 122 may maintain multiple social graphs, where each social graph corresponds to various geographic regions, industries, members, or combinations thereof.

As members establish connections with one another, the members may engage in one or more instant messaging sessions to communicate. Accordingly, the social networking architecture 122 may implement one or more application(s) and/or platform(s) (discussed with reference to FIG. 2) that facilitate these messaging sessions. In one embodiment, when a member of the social networking service logs in, the client device 104 of the member (e.g., client devices 104-108) may send a message to the social networking architecture 122 informing the social networking architecture 122 that the member has logged in.

In turn, the social networking architecture 122 may then update an internal record indicating that the member (e.g., user 124) is available for one or more communication sessions, and then disseminate the connected status (e.g., online status) of the member of the client device 104 by referring to this internal record. Furthermore, the social networking architecture 122 may update one or more connected sessions of members that are connected to the social networking architecture 122 and are direct connections (e.g., first-degree connections) of the member using the client device 104. Thus, members using client device 106 and/or client device 108 may be informed, via a graphic or other indicator on a webpage, that the user 124 has connected to the social networking service. Additionally and/or alternatively, the internal record maintained by the social networking architecture 122 may be used to update other degrees of connections to the user 124, such as second-degree connections or third-degree connections. In this manner, members of the social networking service that are within the social graph of the user 124 and are connected to the social networking service may be informed as to the connected status of the user 124.

However, as discussed above, the client device 104 may have an intermittent connection with the social networking architecture 122. As discussed above, this intermittent connection could lead to frequent and/or rapid disconnections and reconnections between the client device 104 and the social networking architecture 122. To prevent the social networking architecture 122 from needlessly updating other members of the social networking service as to the status of the member of the client device 104, the client device 104 may be configured to communicate one or more heartbeat messages at predetermined intervals to the social networking architecture 122.

Accordingly, in one embodiment, the social networking architecture 122 may configure the client device 104 to send these heartbeat message. For example, the social networking architecture 122 may communicate computer-executable instructions via a webpage (e.g., as JavaScript) or other deliverable (e.g., the client application(s) 112, and/or the programmatic client 114) that instruct the client device 104 how to send these heartbeat messages and at what timing intervals. As discussed below with reference to FIG. 2, the social networking architecture 122 may also implement one or more timing techniques to ensure that the heartbeat messages are properly registered and that the social networking architecture 122 does not inadvertently register the client device 104 as being offline (e.g., disconnected from the social networking service) when, in fact, the client device 104 is still in the process of sending the one or more heartbeat messages.

Figure 2:
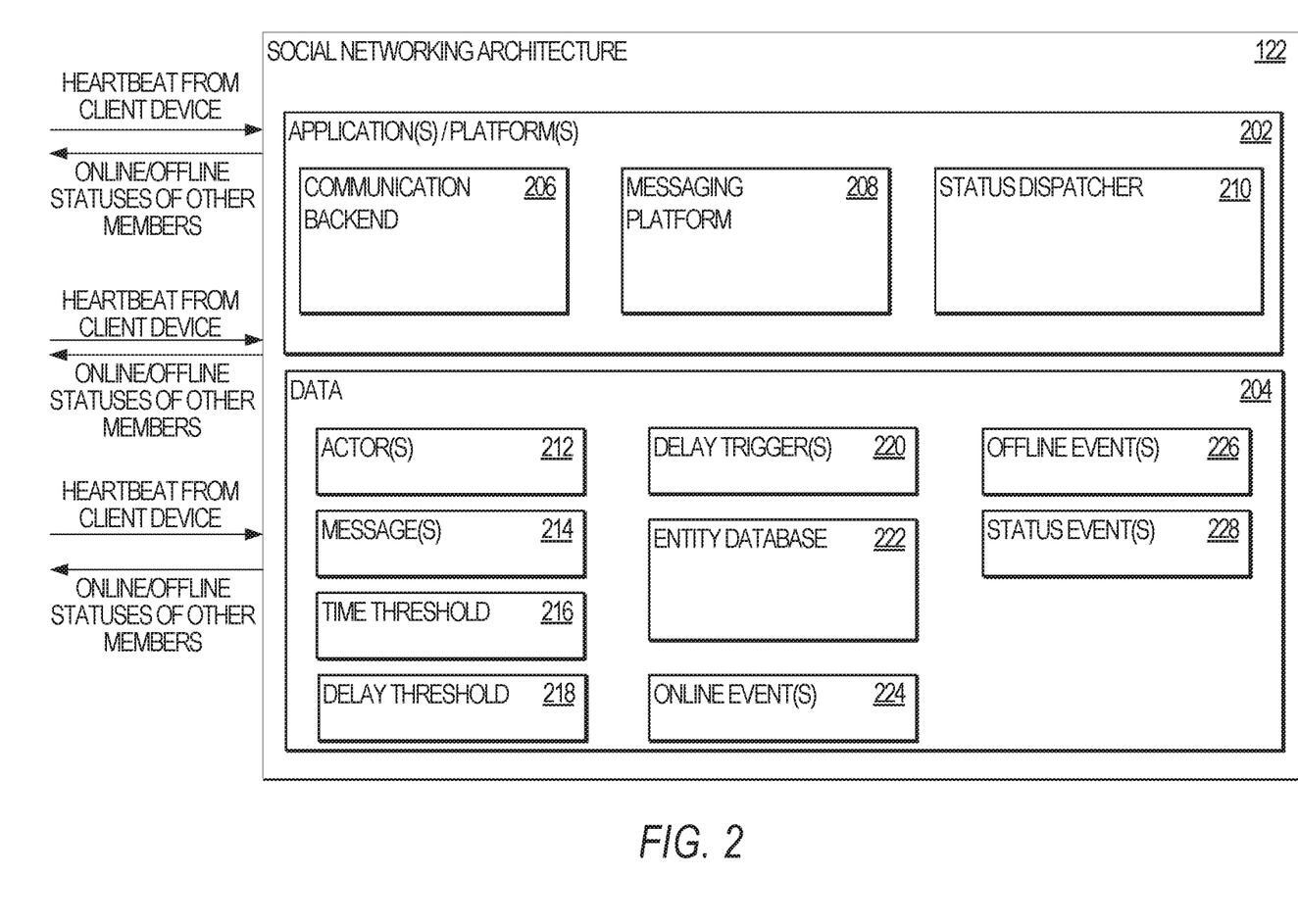

FIG. 2 illustrates the social networking architecture 122 of FIG. 1, according to an example embodiment. In one embodiment, the social networking architecture 122 includes various application(s) and/or platform(s) 202 to facilitate the detection of and data 204 used to support one or more functionalities of the application(s) and/or platform(s) 202. Although not shown in detail, the social networking architecture 122 may also include hardware and/or software components typically implemented in one or more computing devices, such as one or more hardware processors, one or more computer-readable media, one or more communication interfaces, one or more input and/or output devices, and other such components found in a computing device.

The various functional components of the social networking architecture 122 may reside on a single device or may be distributed across several computers in various arrangements. The various components of the social networking architecture 122 may, furthermore, access one or more databases (e.g., the entity database 222), and each of the various components of the social networking architecture 122 may be in communication with one another. Further, while the components of FIG. 2 are discussed in the singular sense, it will be appreciated that in other embodiments multiple instances of the components may be employed.

The processors (not illustrated in FIG. 2) of the social networking architecture 122 may be any type of commercially available processor, such as processors available from the Intel Corporation, Advanced Micro Devices, Texas Instruments, or other such processors. Further still, the one or more processors may include one or more special-purpose processors, such as a Field-Programmable Gate Array (FPGA) or an Application Specific Integrated Circuit (ASIC). The one or more processors may also include programmable logic or circuitry that is temporarily configured by software to perform certain operations. Thus, once configured by such software, the one or more processors become specific machines (or specific components of a machine) uniquely tailored to perform the configured functions and are no longer general-purpose processors.

Using various machine-readable media, the social networking architecture 122 implements the application(s) and/or platform(s) 202 and stores the data 204. The machine-readable media may include one or more devices configured to store instructions and data temporarily or permanently and may include, but not be limited to, random-access memory (RAM), read-only memory (ROM), buffer memory, flash memory, optical media, magnetic media, cache memory, other types of storage (e.g., Erasable Programmable Read-Only Memory (EEPROM)) and/or any suitable combination thereof. The term "machine-readable media" should be taken to include a single medium or multiple media (e.g., a centralized or distributed database, or associated caches and servers) able to store the application(s) and/or platform(s) 202 and the data 204. The term "machine-readable media" may also include one or more machine-readable storage devices. Accordingly, the machine-readable medium may be implemented as a single storage apparatus or device, or, alternatively and/or additionally, as "cloud-based" storage systems or storage networks that include multiple storage apparatus or devices.

In one embodiment, the application(s) and/or platform(s) 202 are written in a computer-programming and/or scripting language. Examples of such languages include, but are not limited to, C, C++, C #, Java, JavaScript, Perl, Python, or any other computer programming and/or scripting language now known or later developed. In this manner, each of the application(s) and/or platform(s) 202 may be implemented in one or more computer-programming and/or scripting language.

With reference to FIG. 2, the application(s) and/or platform(s) 202 of the social networking architecture 122 are configured to determine whether the client device 104 (or any other client devices) are connected (or still connected) to the social networking architecture 122 based on one or more heartbeat messages that the client devices communicate. To perform these and other operations in furtherance of these results, the application(s) and/or platform(s) 202 include, but are not limited to, a communication backend 206, a messaging platform 208, and a status dispatcher 210. While the social networking architecture 122 may include alternative and/or additional applications (e.g., a networking application, a printing application, a software-implemented keyboard, etc.), such alternative and/or additional applications are not germane to this disclosure and the discussion of such is hereby omitted for brevity and readability.

The data 204 referenced and used by the application(s) and/or platform(s) 202 include various types of data in support of determining whether the client device 104 is communicatively coupled to the social networking architecture 122. In this regard, the data 204 includes, but is not limited to, one or more actor(s) 212 that handle the processing of delayed trigger(s) 220 associated with the one or more heartbeat message(s) 214, the one or more heartbeat message(s) 214 received from the client device 104 (or any other client device communicatively coupled to the social networking architecture 122), and a time threshold 216 and a delay threshold 218 used in determining whether the client device 104 has sent any more heartbeat message(s) 214.

The data 204 also include one or more delay trigger(s) 220 that define the conditions of when a check should be performed to determine whether the client device 104 has sent any more heartbeat message(s) 214. The data 204 may further include an entity database 222 (or an entity table), where entries in the database 222 correspond with client devices communicatively coupled to the social networking architecture 122. Finally, the data 104 includes various types of events associated with client devices and/or members, such as online event(s) 224 that indicate whether a member is online (e.g., connected to the social networking service), offline event(s) 226 that indicate whether a member is offline (e.g., not connected to the social networking service), and status event(s) 228 that indicate a member-provided status (e.g., a custom message or other identifier that indicates the status of the member). The events 224-228 may be disseminated to one or more of the client devices 104-108 in communication with the social networking architecture 122.

In determining whether the member of the client device 104 is online with the social networking service, the application(s) and/or platform(s) 202 treat the member as being online as long as the client device 104 maintains an active connection with the social networking architecture 122. In this regard, when the social networking architecture 122 first detects a heartbeat message 214 from the client device 104, the social networking architecture 122 publishes the status of the member as being online with the social networking service to other members of the social networking service where these other members are "listening" for the connection status of that first member. In this context, the term "listening" refers to a situation where the other members are connected to the social networking service via an application (e.g., a web browser, a stand-alone application, a programmatic client, etc.), and the application is subscribed to a service provide by the social networking service that disseminates updates about a particular topic, such as when a particular member is online, offline, changes status, etc. Thus, the application that has subscribed to the service provided by the social networking architecture 122 is "listening" for updates from the social networking architecture 122.

When a message 214 is received from the client device 104, the communication backend 206 passes the received message to the messaging platform 208. In turn, the messaging platform 208 parses and/or extracts a timestamp from the received message. Accordingly, the messaging platform 208 may then store the timestamp in the entity database 222, where the timestamp is associated with the client device 104 and/or with a member using the client device 104. Should a timestamp already exists within the entity database 222, the received timestamp replaces the existing timestamp in the entity database 222 (e.g., the messaging platform 208 updates the entity database 222 with the timestamp of the received message). Where the social networking architecture 122 discontinues receiving heartbeat message(s) 214 from the client device 104, the timestamp stored in the entity database 222 is no longer updated and the status of the member associated with the client device 104 is changed to an offline status.

The change in status of the member and/or client device 104 accordingly results in the generation of an event, such as an online event 224 and/or an offline event 226, which is then disseminated to other members and/or client devices communicatively coupled to the social networking architecture 122. In this manner, the heartbeat message(s) 214 ensure that the social networking architecture 122 can tolerate jitter (e.g., the client device 104 dropping and reconnecting its connection with the social networking service 122) within a time threshold of the received heartbeat message(s) 214. Furthermore, the disclosed implementation allows the social networking architecture 122 to provide a steady online signal for the member even if there are temporary fluctuations in his or her connection with the social networking architecture 122.

The communication backend 206 of the social networking architecture 122 is configured to receive one or more heartbeat message(s) 214 from the client device 104. In one embodiment, each heartbeat message 214 is separated by a time threshold 216. Examples of the time threshold 216 include one second, five seconds, 30 seconds, two minutes, and so forth. Furthermore, the time threshold 216 may be static or configurable. In this regard, the client device 104 may be configured to transmit heartbeat message(s) at a non-changing (e.g., static) interval.

However, where the time threshold 216 is dynamic, the social networking architecture 122, via the communication backend 206, may communicate a message to the client device 104 that instructs the client device 104 to change the time threshold 216 for that particular client device 104. Thus, the social networking architecture 122 may instruct the client device 104 to change its time threshold 216 from two seconds to two minutes. In one embodiment, the social networking architecture 122 instructs the client device 104 to change its time threshold 216 when one or more predetermined conditions are satisfied. As one example, a predetermined condition may be that the client device 104 has maintained a persistent connection (e.g., a connection with no interruptions and/or delays) with the social networking architecture 122. A persistent connection signals to the social networking architecture 122 that there is little risk of the client device 104 having a jittery connection. Accordingly, an increase in the time threshold 216 means that the social networking architecture 122 expends less computing resources in managing the connection with that particular client device 104. Thus, a configurable time threshold 216 provides a technical benefit to the rest of the social networking architecture 122.

In one embodiment, a heartbeat message 214 includes one or more heartbeat message attributes. These heartbeat message attributes may include, but are not limited to, an entity identifier (which may be unique and identifies the member and/or client device 104) and a timestamp that identifies when the heartbeat message 214 was emitted. In one embodiment, the client device 104 provides the timestamp value for the timestamp of the heartbeat message 214.

When the communication backend 206 receives the heartbeat message 214 from the client device 104, the communication backed 206 may pass and/or send the received message to the messaging platform 208. The messaging platform 208 is configured to monitor and/or process the incoming messages received from the communication backend 206 and/or to instruct the status dispatcher 210 when to send event(s) and/or message(s) to other client devices communicatively coupled to the social networking architecture 122.

In one embodiment, when the messaging platform 208 receives the received heartbeat message 214, the messaging platform 208 parses out and/or extracts the entity identifier and/or timestamp from the heartbeat message attributes. The messaging platform 208 may then query the entity database 222 with the extracted entity identifier to determine whether an entry in the entity database 222 exists with the extracted entity identifier.

Where the entity database 222 returns that an entry does not exist in the entity database 222 (e.g., by returning a NULL value), the messaging platform 208 may update the entity database 222 to have an entry that includes the extracted entity identifier and the extracted heartbeat timestamp. In addition, the messaging platform 208 may instruct the status dispatcher 210 to generate an online event 224 that indicates that the member associated with the client device 104 has "gone online" (e.g., has logged into the social networking service). As discussed with reference to FIG. 3, the status dispatcher 210 may then communicate the online event 224 to one or more subscribers to the status dispatcher 210.

The messaging platform 208 may also determine that the member associated with the client device 104 has is offline based on the timestamp associated with the received heartbeat message 214. In one embodiment, the entity database 222 returns an entry having the entity identifier and an older timestamp (e.g., a timestamp that was previously entered into the entity database 222). The messaging platform 208 may compare the current timestamp with the older timestamp in determining whether the member associated with the client device 104 should be changed to an online status. In particular, the messaging platform 208 may perform the following comparison:

$$T_C > T_P + T_T + D_T \quad \text{(eq. 1)}$$

where, $T_C$ is the current timestamp (e.g., the timestamp extracted from the most recently received heartbeat message);

$T_P$ is the previous timestamp (e.g., the timestamp stored in the entity database 222);

$T_T$ is the time threshold 216 between heartbeat messages; and $D_T$ is the delay threshold 218 for triggering a determination as to whether another heartbeat message has been received.

In this context, when a value of $T_P + T_T + D_T$ is reached for a particular entry in the entity database 222, this value signifies that a heartbeat message has not been received from the member and/or client device associated with the entry. A delay threshold 218 is factored into the determination of whether a heartbeat message has been received because there is some inherent delay in between the sending of heartbeat messages. For example, the client device 104 may be instructed to send heartbeat messages every three seconds, but the social networking architecture 122 may require five seconds to process the newly emitted heartbeat. Thus, without the delay threshold 218, the social networking architecture 122 may improperly identify a member as being offline when, in fact, the member is actually online. Accordingly, the delay threshold 218 provides a technical benefit to the disclosed social networking architecture 122 in that it allows the social networking architecture 122 to properly process incoming heartbeat message(s) 214. Examples of values for the delay threshold 218 include, but are not limited to, one second, five seconds, 30 seconds, one minute, and other such values.

Although the delay threshold 218 is described as being a single value, the social networking architecture 122 may adjust this value depending on the computing load being experienced by the social networking architecture 122. In this regard, where the social networking architecture 122 is experiencing a heavy load (e.g., a non-trivial amount of computing resources are being utilized), the social networking architecture 122 may increase the delay threshold 218. Similarly, where the social networking architecture 122 is experience a decreased load (e.g., a non-trivial amount of computing resources are available), the social networking architecture 122 may decrease the delay threshold 218. Thus, adjustments to the delay threshold 218 may correspond to the computing workload being experienced by the social networking architecture 122.

In some instances, the entity database 222 may return a non-NULL value or other value indicating that an entry exists for the entity identifier provided by the messaging platform 208. In this regard, the messaging platform 208 then retrieves the previously stored heartbeat timestamp associated with the extracted entity identifier, and determines whether the previously stored heartbeat timestamp has expired. In particular, the entity database 222 performs the comparison in equation 1 (above). If the current timestamp is less than the summation of the previously stored timestamp, the time threshold 216, and the delay threshold 218, the messaging platform 208 determines that the timestamp has not expired and, thus, that the member associated with the entity identifier is still online. Accordingly, the messaging platform 208 then updates the entry in the entity database 222 with the recently received timestamp.

The messaging platform 208 is also configured to generate one or more delay trigger(s) 220, where the delay trigger(s) 220 cause the messaging platform 208 to determine whether a member and/or client device has disconnected or is no longer in communication with the social networking architecture 122. In one embodiment, each received heartbeat message 214 causes the messaging platform 208 to instantiate a delay trigger 220, and each delay trigger 220 is associated with the entity identifier of the heartbeat message that caused the instantiation. In this manner, each delay trigger 220 may be associated with a particular entity identifier.

Further still, each delay trigger 220 may be associated with an execution time, where the execution time is equal to the summation of the timestamp of the recently received heartbeat message, the time threshold 216, and two times the delay threshold 218. In other words, $$E_{DT}=T_C+T_T+(2\times D_T) \quad \text{(eq. 2)}$$

where, $E_{DT}$ is the execution time of a given trigger, $T_C$ is the current timestamp (e.g., the timestamp of the recently received heartbeat message);

$T_T$ is the time threshold 216; and $D_T$ is the delay threshold 218.

As discussed above, the social networking architecture 122 may implement the delay threshold 218 to ensure that the heartbeat messages are properly serviced and that a member is not inadvertently identified as being offline. For each delay trigger 220 that is instantiated, the status dispatcher 210 may be configured to monitor and/or perform the execution of the delay trigger 220.

In one embodiment, when the execution time indicates that the delay trigger 220 is to execute, the status dispatcher 210 instructs the messaging platform 208 to query the entity database 222 with the entity identifier associated with the delay trigger 220 being executed. The messaging platform 208 then determines whether the heartbeat timestamp stored in the entity database 222 has expired. The messaging platform 208 performs this determination on the heartbeat timestamp stored in the entity database 222 because the messaging platform 208 may have received a heartbeat message from the member and/or client device, and may have updated the entity database 222.

To determine whether the heartbeat timestamp stored in the entity database 222 has expired, the messaging platform 208 may compare the current time with the summation of the stored heartbeat timestamp, the time threshold 216, and the delay threshold 216 (e.g., $T_P+T_T+D_T$). Unlike the current timestamp of equation 1, which refers to the extracted timestamp of the recently received heartbeat message, the current timestamp in this context is the time when the delay trigger 220 executes (or substantially close to when the delay trigger 220 executes). If the current timestamp is greater than the summation, this state indicates that the communication backend 206 has not received a heartbeat message from the member and/or client device; accordingly, the messaging platform 208 instructs the status dispatcher 210 to generate an offline event 226 indicating that the member and/or client device 104 is offline. Conversely, if the heartbeat timestamp stored in the entity database 222 has not expired, the status of the member and/or client device 104 remains unchanged and the social networking architecture 122 does not take further action.

During the connection lifecycle of the member and/or client device 104, the member may provide a custom status with a message from the member. When the member changes his or status, e.g., via the client device 140, the client device 140 may send a status update message to the social networking architecture 122. Accordingly, the messaging platform 208 and/or status dispatcher 210 may generate one or more status event(s) 228 with the status provided by the member. This status event 228 may then be disseminated to listening members associated with the member that changed his or her status to be informed of the change in status. The status provided by the member may also be stored in the entity database 222 for later retrieval by one or more of the application(s) and/or platforms(s) 202.

As the social networking architecture 122 may implement hundreds or thousands of delay trigger(s) 220, each delay trigger may be handled by an actor 212. In this regard, an actor 212 may be a process handled by Akka™, which is available from Lightbend, Inc. As known to one of ordinary skill in the art, Akka™ is a toolkit for building concurrent, distributed, and resilient message-driven applications. In one embodiment, the social networking architecture 122 creates an Akka™ actor 212 for each entity identifier that the social networking architecture 122 receives. Furthermore, the actor 212 is provided with the entity identifier, the heartbeat timestamp associated with the most recently received heartbeat message 214, and the execution time for a given delay trigger 220. Where an actor 212 associated with a particular entity identifier already exists, the social networking architecture 122 is configured to update the heartbeat timestamp associated with the actor 212 and the execution time of the delay trigger 220. Furthermore, when the actor 212 has executed the delay trigger 220, the actor 212 is terminated and its lifecycle is ended. In this manner, the social networking architecture 122 is configured to implement hundreds or thousands of actor(s) 212 to handle the processing of the various delay trigger(s) 220.

Figure 3:
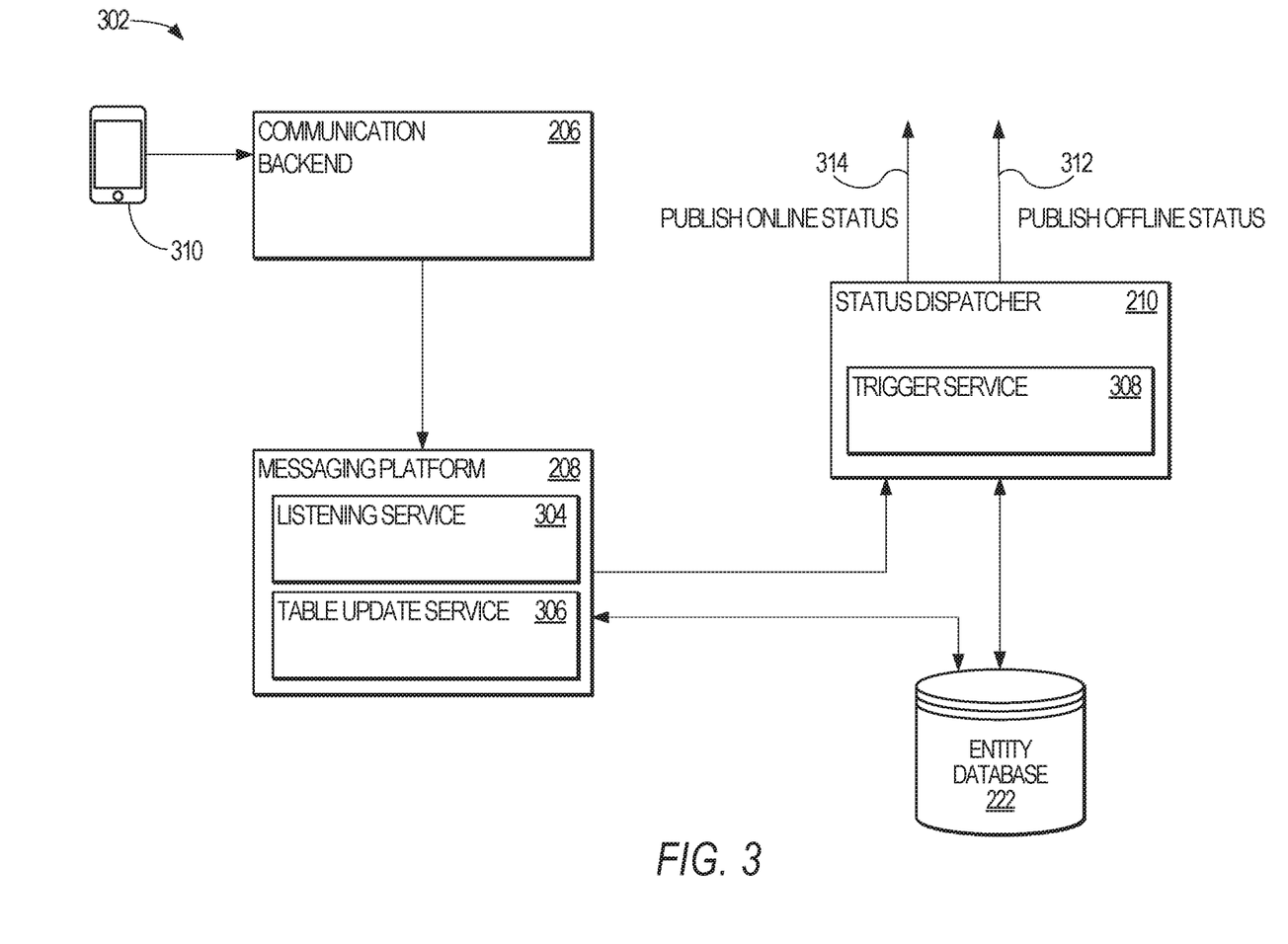

FIG. 3 illustrates a processing diagram 302, in accordance with an example embodiment, of the various application(s) and/or platform(s) 202, shown in FIG. 2, processing one or more messages received from a client device 310.

As shown in FIG. 3, the messaging platform 208 may include a listening service 304 and/or a table update service 306. The listening service 304 is configured to listen for heartbeat messages received by the communication backend 206 and communicated to the messaging platform 208. Furthermore, the table update service 306 is configured to update the one or more entries in the entity database 222. As discussed above, the messaging platform 208 may be configured to create a new entry in the entity database 222 when a given entity identifier does not have a corresponding entry in the entity database 222. Furthermore, the messaging platform 208 may be configured to delete and/or remove one or more entries from the entity database 222, such as when a predetermined amount of time has elapsed since the creation of the entry in the entity database 222.

The status dispatcher 210 is configured to communicate the various event(s) 224-228 to one or more client devices communicatively coupled to the social networking architecture 122. In one embodiment, the status dispatcher 210 provides a service 314 that publishes online event(s) 224 associated with an entity identifier and a service 312 that publishes offline event(s) 226 associated with an entity identifier. Additionally and/or alternatively, the services 312-314 may be implemented as a single service that publishes the event(s) 224-226. Furthermore, the service 312 and/or service 314 may be configured to publish status event(s) 228 associated with an entity identifier.

The status dispatcher 210 may also implement a trigger service 308 for instantiating one or more of the delay trigger(s) 220 and/or actor(s) 212. In this regard, the status dispatcher 210 receives instructions from the messaging platform 208 to instantiate a delay trigger with a particular set of values (e.g., a provided heartbeat timestamp, a time threshold 216, and a delay threshold 218), and the status dispatcher 210 instantiates the delay trigger 220 accordingly. Additionally and/or alternatively, the status dispatcher 210 determines the execution time for when a delay trigger 220 is to execute, and generates an actor 212 to perform the execution of the delay trigger 220. Although the messaging platform 208 may provide the status dispatcher 210 with one or more values (e.g., the entity identifier, a heartbeat timestamp, etc.), the status dispatcher 210 may also be configured to obtain such values from the entity database 222. In this manner, the status dispatcher 210 handles and/or facilitates the dissemination of event(s) 224-228, the instantiation of one or more delay trigger(s) 220, and the execution of such delay trigger(s) 220 by one or more of the actor(s) 212.

Figure 4A:
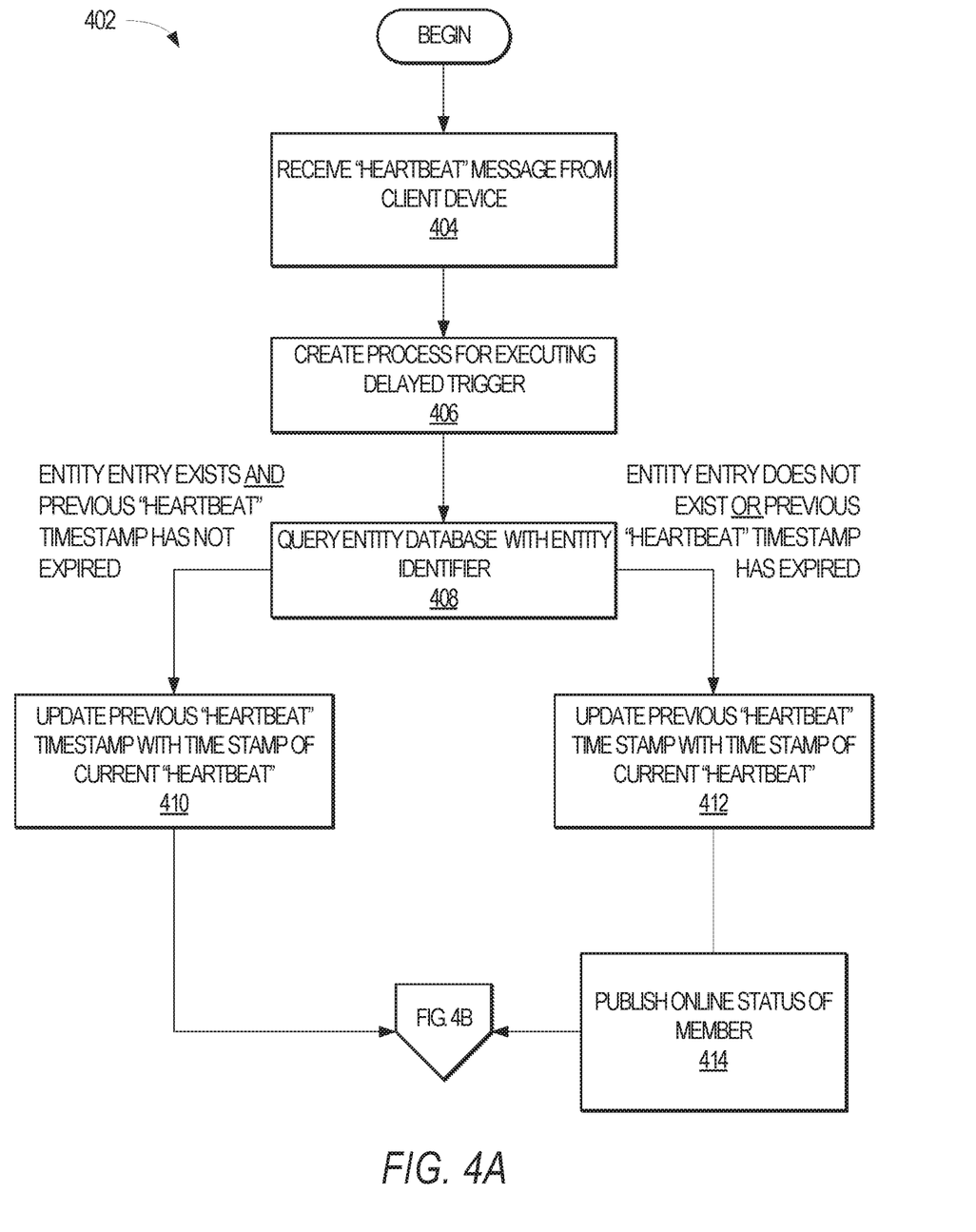
Figure 4B:
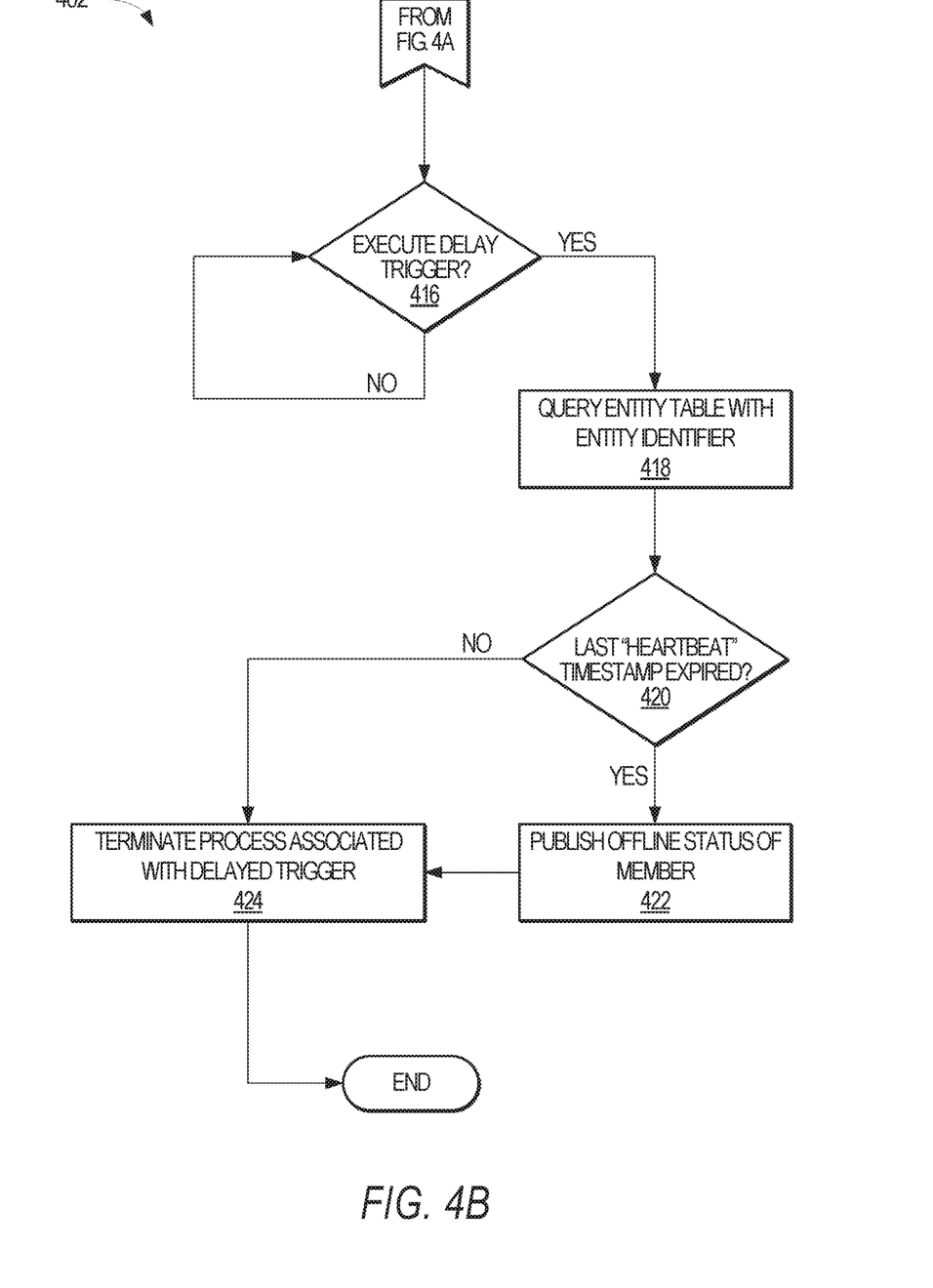
Figure 5:
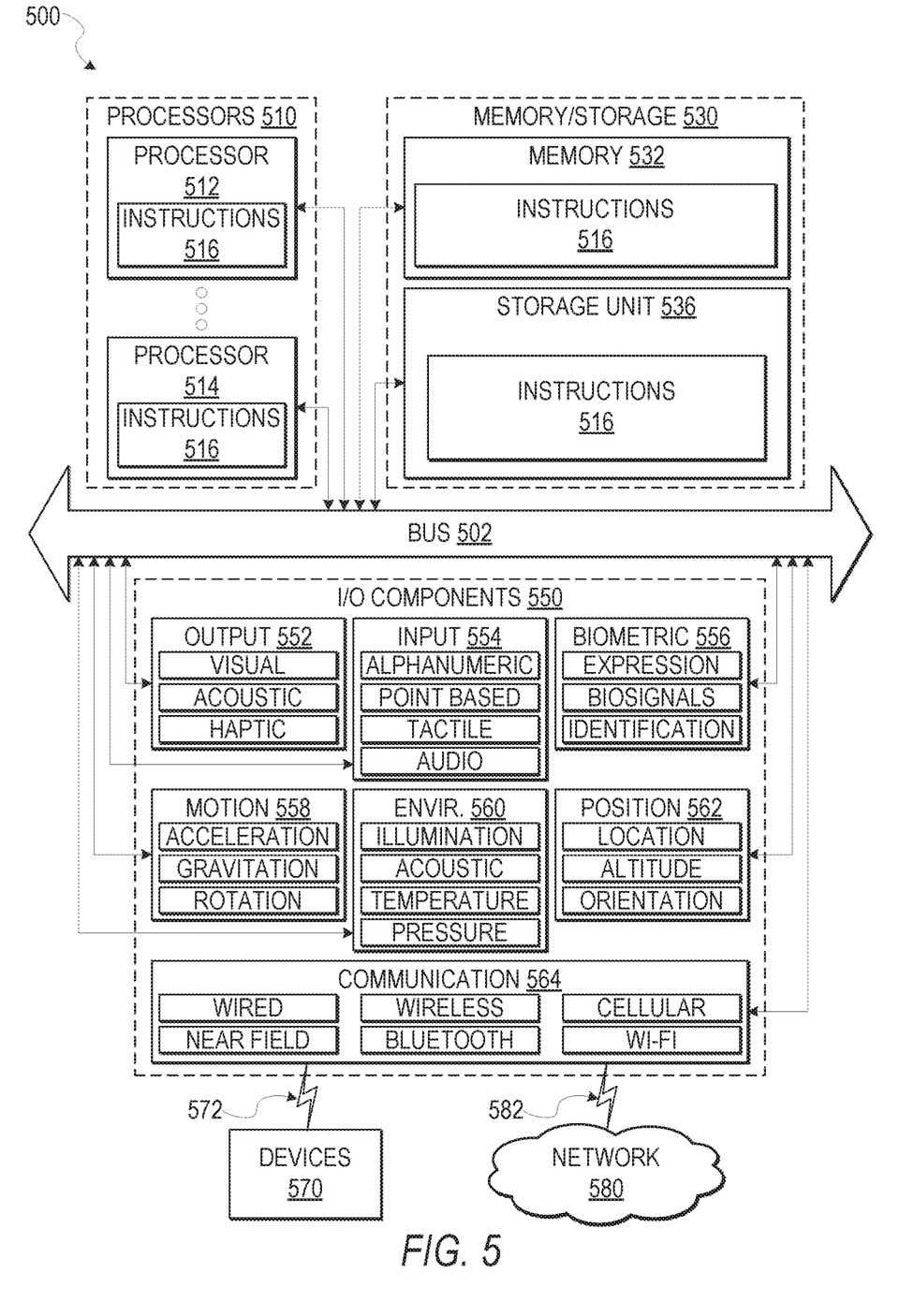

FIGS. 4A-4B illustrate a method 402, in accordance with an example embodiment, for publishing notifications as to whether a member of a social networking service is online or offline. The method 402 may be implemented by one or more of the application(s) and/or platform(s) 202 of the social networking architecture 122 and is discussed by way of reference thereto.

Referring initially to FIG. 4A, the social networking architecture 122 may receive a heartbeat message from a client device (e.g., client device 104) (Operation 404). In one embodiment, the communication backend 206 receives the heartbeat message and communicates it to the messaging platform 208. In turn, the messaging platform 208 may then extract one or more heartbeat message attributes from the heartbeat message, such as an entity identifier that identifies an entity that sent the heartbeat message and a heartbeat timestamp that indicates when the heartbeat message was generated and/or sent. The messaging platform 208 may then instruct the status dispatcher 210 to create one or more processes (e.g., actor(s) 212) for executing a delayed trigger 220 associated with the entity identifier of the received heartbeat message (Operation 406). As discussed above, the execution time of the delayed trigger may be determined from the received heartbeat timestamp, a time threshold 216, and a delay threshold 218. Furthermore, one or more of these values may be used to instantiate the actor 212 responsible for executing the delay trigger 220.

The messaging platform 208 may then query entity database 222 with the extracted entity identifier to determine whether the member and/or client device 104 associated with the extracted entity identifier should be identified as online or offline (Operation 408). Where an entry exists in the entity database 222 and the previous heartbeat timestamp has not expired, the messaging platform 208 is configured to update the timestamp associated with the entry of the entity identifier with the recently received heartbeat timestamp (Operation 410). As the heartbeat timestamp has not yet expired, the status of the member and/or client device has not effectively changed; therefore, the messaging platform 208 may not instruct the status dispatcher 210 to publish a change in status of the member.

Where an entry does not exist in the entity database 222 or the heartbeat timestamp stored in the entity database 222 has expired, the messaging platform 208 updates (e.g., replaces) the stored heartbeat timestamp with the heartbeat timestamp of the recently received heartbeat message (Operation 412). The messaging platform 208 may further instruct the status dispatcher 210 to generate an online event 224 for the member associated with the entity identifier, and to disseminate the generated online event 224 to other members of the social networking service (e.g., connections of the member associated with the entity identifier) (Operation 414).

Referring next to FIG. 4B, an actor 212 determines whether to execute a corresponding delay trigger 220 (Operation 416). In one embodiment, the actor 212 determines to execute a corresponding delay trigger 220 when a predetermined and/or computed time has been reached. Where the predetermined time has not been reached (e.g., the "NO" branch of Operation 416), the actor 212 continues to wait until such time is reached. When the predetermined time has been reached (e.g., the "YES" branch of Operation 416), the actor 212 executes the corresponding delay trigger 220.

In this regard, the status dispatcher 210 and/or the messaging platform 208 may query the entity database 222 with the entity identifier associated with the delay trigger 220 (Operation 418). The messaging platform 208 and/or the status dispatcher 210 then determine whether the heartbeat timestamp stored in the entity database 222 has expired (Operation 420). Where this determination is made in the affirmative (e.g., "YES" branch of Operation 420), the status dispatcher 210 generates an offline event 226 for the member associated with the entity identifier, and publishes the offline event 226 to one or more other members of the social networking service (Operation 422). Additionally and/or alternatively, where this determination is made in the negative (e.g., the "NO" branch of Operation 420), the actor 212 corresponding to the delay trigger 220 is terminated and the lifecycle of the actor 212 is ended (Operation 424).

In this manner, the disclosed systems and methods provide a mechanism for monitoring the online status of a member of a social networking service. Further still, the disclosure provides for an implementation where an anti-jitter mechanism is employed to ensure that computing resources are not wasted in updating the status of a member using a client device that has an intermittent connection. As the intermittent connection can cause the client device to frequently disconnect and reconnect with a social networking architecture, the social networking architecture is likely to waste computing resources in updating the online status of the member. However, with the disclosed anti-jitter mechanism, the social networking architecture uses those computing resources in a more efficient manner, updating the status of the member in response to the expiration of a timestamp associated with a heartbeat message received by the client device. Thus, the disclosed anti-jitter mechanism improves upon the functioning of the social networking architecture within the technical field of networked communications.

Modules, Components, and Logic

Certain embodiments are described herein as including logic or a number of components, modules, or mechanisms. Modules may constitute either software modules (e.g., code embodied on a machine-readable medium or machine-readable storage device) or hardware modules. A "hardware module" is a tangible unit capable of performing certain operations and may be configured or arranged in a certain physical manner. In various example embodiments, one or more computer systems (e.g., a standalone computer system, a client computer system, or a server computer system) or one or more hardware modules of a computer system (e.g., a processor or a group of processors) may be configured by software (e.g., an application or application portion) as a hardware module that operates to perform certain operations as described herein.

In some embodiments, a hardware module may be implemented mechanically, electronically, or any suitable combination thereof. For example, a hardware module may include dedicated circuitry or logic that is permanently configured to perform certain operations. For example, a hardware module may be a special-purpose processor, such as a FPGA or an ASIC. A hardware module may also include programmable logic or circuitry that is temporarily configured by software to perform certain operations. For example, a hardware module may include software executed by a general-purpose processor or other programmable processor. Once configured by such software, hardware modules become specific machines (or specific components of a machine) uniquely tailored to perform the configured functions and are no longer general-purpose processors. It will be appreciated that the decision to implement a hardware module mechanically, in dedicated and permanently configured circuitry, or in temporarily configured circuitry (e.g., configured by software) may be driven by cost and time considerations.

Accordingly, the phrase "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where a hardware module comprises a general-purpose processor configured by software to become a special-purpose processor, the general-purpose processor may be configured as respectively different special-purpose processors (e.g., comprising different hardware modules) at different times. Software accordingly configures a particular processor or processors, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple hardware modules exist contemporaneously, communications may be achieved through signal transmission (e.g., over appropriate circuits and buses) between or among two or more of the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions described herein. As used herein, "processor-implemented module" refers to a hardware module implemented using one or more processors.

Similarly, the methods described herein may be at least partially processor-implemented, with a particular processor or processors being an example of hardware. For example, at least some of the operations of a method may be performed by one or more processors or processor-implemented modules. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an API).

The performance of certain of the operations may be distributed among the processors, not only residing within a single machine, but deployed across a number of machines. In some example embodiments, the processors or processor-implemented modules may be located in a single geographic location (e.g., within a home environment, an office environment, or a server farm). In other example embodiments, the processors or processor-implemented modules may be distributed across a number of geographic locations.

Machine and Software Architecture

The modules, methods, applications and so forth described in conjunction with FIGS. 2-4B are implemented in some embodiments in the context of a machine and an associated software architecture. The sections below describe a representative architecture that is suitable for use with the disclosed embodiments.

Software architectures are used in conjunction with hardware architectures to create devices and machines tailored to particular purposes. For example, a particular hardware architecture coupled with a particular software architecture will create a mobile device, such as a mobile phone, tablet device, or so forth. A slightly different hardware and software architecture may yield a smart device for use in the "internet of things" while yet another combination produces a server computer for use within a cloud computing architecture. Not all combinations of such software and hardware architectures are presented here as those of skill in the art can readily understand how to implement the inventive subject matter in different contexts from the disclosure contained herein.

Example Machine Architecture and Machine-Readable Medium

FIG. 6 is a block diagram illustrating components of a machine 500, according to some example embodiments, able to read instructions from a machine-readable medium (e.g., a machine-readable storage medium or machine-readable storage device) and perform any one or more of the methodologies discussed herein. Specifically, FIG. 6 shows a diagrammatic representation of the machine 500 in the example form of a computer system, within which instructions 516 (e.g., software, a program, an application, an applet, an app, or other executable code) for causing the machine 500 to perform any one or more of the methodologies discussed herein may be executed. For example, the instructions 516 may cause the machine 500 to execute the flow diagrams of FIGS. 4A-4B. Additionally, or alternatively, the instructions 516 may implement one or more of the components of FIGS. 2-3. The instructions 516 transform the general, non-programmed machine 500 into a particular machine 500 programmed to carry out the described and illustrated functions in the manner described. In alternative embodiments, the machine 500 operates as a standalone device or may be coupled (e.g., networked) to other machines. In a networked deployment, the machine 500 may operate in the capacity of a server machine or a client machine in a server-client network environment, or as a peer machine in a peer-to-peer (or distributed) network environment. The machine 500 may comprise, but not be limited to, a server computer, a client computer, a personal computer (PC), a tablet computer, a laptop computer, a netbook, a PDA, or any machine capable of executing the instructions 516, sequentially or otherwise, that specify actions to be taken by machine 500. Further, while only a single machine 500 is illustrated, the term "machine" shall also be taken to include a collection of machines 500 that individually or jointly execute the instructions 516 to perform any one or more of the methodologies discussed herein.

The machine 500 may include processors 510, memory/storage 530, and I/O components 550, which may be configured to communicate with each other such as via a bus 502. In an example embodiment, the processors 510 (e.g., a Central Processing Unit (CPU), a Reduced Instruction Set Computing (RISC) processor, a Complex Instruction Set Computing (CISC) processor, a Graphics Processing Unit (GPU), a Digital Signal Processor (DSP), an ASIC, a Radio-Frequency Integrated Circuit (RFIC), another processor, or any suitable combination thereof) may include, for example, processor 512 and processor 514 that may execute the instructions 516. The term "processor" is intended to include multi-core processor that may comprise two or more independent processors (sometimes referred to as "cores") that may execute instructions 516 contemporaneously. Although FIG. 6 shows multiple processors 510, the machine 500 may include a single processor with a single core, a single processor with multiple cores (e.g., a multi-core process), multiple processors with a single core, multiple processors with multiples cores, or any combination thereof.

The memory/storage 530 may include a memory 532, such as a main memory, or other memory storage, and a storage unit 536, both accessible to the processors 510 such as via the bus 502. The storage unit 536 and memory 532 store the instructions 516 embodying any one or more of the methodologies or functions described herein. The instructions 516 may also reside, completely or partially, within the memory 532, within the storage unit 536, within at least one of the processors 510 (e.g., within the processor's cache memory), or any suitable combination thereof, during execution thereof by the machine 500. Accordingly, the memory 532, the storage unit 536, and the memory of processors 510 are examples of machine-readable media.

As used herein, "machine-readable medium" includes a machine-readable storage device able to store instructions 516 and data temporarily or permanently and may include, but is not limited to, random-access memory (RAM), read-only memory (ROM), buffer memory, flash memory, optical media, magnetic media, cache memory, other types of storage (e.g., Erasable Programmable Read-Only Memory (EEPROM)) and/or any suitable combination thereof. The term "machine-readable medium" should be taken to include a single medium or multiple media (e.g., a centralized or distributed database, or associated caches and servers) able to store instructions 516. The term "machine-readable medium" shall also be taken to include any medium, or combination of multiple media, that is capable of storing instructions (e.g., instructions 516) for execution by a machine (e.g., machine 500), such that the instructions, when executed by one or more processors of the machine 500 (e.g., processors 510), cause the machine 500 to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" excludes signals per se.

The input/output (I/O) components 550 may include a wide variety of components to receive input, provide output, produce output, transmit information, exchange information, capture measurements, and so on. The specific I/O components 550 that are included in a particular machine will depend on the type of machine. For example, portable machines such as mobile phones will likely include a touch input device or other such input mechanisms, while a headless server machine will likely not include such a touch input device. It will be appreciated that the I/O components 550 may include many other components that are not shown in FIG. 6. The I/O components 550 are grouped according to functionality merely for simplifying the following discussion and the grouping is in no way limiting. In various example embodiments, the I/O components 550 may include output components 552 and input components 554. The output components 552 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 554 may include alphanumeric input components (e.g., a keyboard, a touch screen configured to receive alphanumeric input, a photo-optical keyboard, or other alphanumeric input components), point based input components (e.g., a mouse, a touchpad, a trackball, a joystick, a motion sensor, or other pointing instrument), tactile input components (e.g., a physical button, a touch screen that provides location and/or force of touches or touch gestures, or other tactile input components), audio input components (e.g., a microphone), and the like.

In further example embodiments, the I/O components 550 may include biometric components 556, motion components 558, environmental components 560, or position components 562 among a wide array of other components. For example, the biometric components 556 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components 558 may include acceleration sensor components (e.g., accelerometer), gravitation sensor components, rotation sensor components (e.g., gyroscope), and so forth. The environmental components 560 may include, for example, illumination sensor components (e.g., photometer), temperature sensor components (e.g., one or more thermometer that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment. The position components 562 may include location sensor components (e.g., a GPS receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 550 may include communication components 564 operable to couple the machine 500 to a network 580 or devices 570 via coupling 582 and coupling 572, respectively. For example, the communication components 564 may include a network interface component or other suitable device to interface with the network 580. In further examples, communication components 564 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 570 may be another machine or any of a wide variety of peripheral devices (e.g., a peripheral device coupled via a USB).

Moreover, the communication components 564 may detect identifiers or include components operable to detect identifiers. For example, the communication components 564 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF416, Ultra Code, UCC RSS-2D bar code, and other optical codes), or acoustic detection components (e.g., microphones to identify tagged audio signals). In addition, a variety of information may be derived via the communication components 564, such as location via Internet Protocol (IP) geo-location, location via Wi-Fi® signal triangulation, location via detecting a NFC beacon signal that may indicate a particular location, and so forth.

Transmission Medium

In various example embodiments, one or more portions of the network 580 may be an ad hoc network, an intranet, an extranet, a VPN, a LAN, a WLAN, a WAN, a WWAN, a MAN, the Internet, a portion of the Internet, a portion of the PSTN, a plain old telephone service (POTS) network, a cellular telephone network, a wireless network, a Wi-Fi® network, another type of network, or a combination of two or more such networks. For example, the network 580 or a portion of the network 580 may include a wireless or cellular network and the coupling 582 may be a Code Division Multiple Access (CDMA) connection, a Global System for Mobile communications (GSM) connection, or other type of cellular or wireless coupling. In this example, the coupling 582 may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard setting organizations, other long range protocols, or other data transfer technology.

The instructions 516 may be transmitted or received over the network 580 using a transmission medium via a network interface device (e.g., a network interface component included in the communication components 564) and utilizing any one of a number of well-known transfer protocols (e.g., hypertext transfer protocol (HTTP)). Similarly, the instructions 516 may be transmitted or received using a transmission medium via the coupling 572 (e.g., a peer-to-peer coupling) to devices 570. The term "transmission medium" shall be taken to include any intangible medium that is capable of storing, encoding, or carrying instructions 516 for execution by the machine 500, and includes digital or analog communications signals or other intangible medium to facilitate communication of such software.

Language

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Although an overview of the inventive subject matter has been described with reference to specific example embodiments, various modifications and changes may be made to these embodiments without departing from the broader scope of embodiments of the present disclosure. Such embodiments of the inventive subject matter may be referred to herein, individually or collectively, by the term "invention" merely for convenience and without intending to voluntarily limit the scope of this application to any single disclosure or inventive concept if more than one is, in fact, disclosed.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

As used herein, the term "or" may be construed in either an inclusive or exclusive sense. Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

We claim:

1. A system comprising:
   machine-readable medium storing computer-executable instructions; and
   at least one hardware processor communicatively coupled to the machine-readable medium that, when the computer-executable instructions are executed, configures the system to:
   receive a heartbeat message from an instant messaging application executing at a computing device, the heartbeat message communicated from the computing device to the system at a predetermined time interval that is dynamically determined by the system based on a characteristic of a network connection between the computing device and the system;
   extract an entity identifier from the heartbeat message, the entity identifier identifying a member of a social networking service and associated with the received heartbeat message;
   extract a first timestamp from the heartbeat message received from the instant messaging application executing at the computing device, the first timestamp indicating a time when the heartbeat message was sent by the computing device;
   generate a delayed trigger for determining whether a status of the member is to be changed from online to offline, the delayed trigger having an execution time derived as the sum of time indicated by the extracted first timestamp, the predetermined time interval, and a delay threshold;
   execute the delayed trigger in response to a determination that the execution time for the delayed trigger has been reached; and
   publish an online status of the member in response to the execution of the delayed trigger, wherein publishing the online status of the member includes communicating the online status of the member to one or more computing devices of other members of the online social networking service.

2. The system of claim 1, wherein the system is further configured to:
   execute the delayed trigger by querying an entity database to determine whether the entity database includes an entry corresponding to the entity identifier; and
   based on the determination in response to the query, publish the online status of the member.

3. The system of claim 1, wherein the system is further configured to:
   compare the extracted first timestamp with a second timestamp, wherein:
   the second timestamp indicates a time when a previous heartbeat message was sent; and
   the previous heartbeat message is associated with the member associated with the received heartbeat message; and
   based on the comparison of the first timestamp with the second timestamp, publish the online status of the member.

4. The system of claim 1, wherein the system is further configured to:
   store the extracted first timestamp in an entity database comprising at least one entry corresponding to the entity identifier; and
   publish an offline status of the member in response to a determination that the extracted first timestamp has expired.

5. The system of claim 4, wherein, after determining that the computing device has maintained a persistent connection for some duration of time, the system is further configured to:
   communicate a message to the computing device instructing the computing device to change a predetermined time interval at which heartbeat messages are to be communicated by the computing device.

6. A method comprising:
   receiving, by one or more hardware processors, a heartbeat message from an instant messaging application executing at a computing device, the heartbeat message communicated from the computing device to the system at a predetermined time interval that is dynamically determined by the system based on a characteristic of a network connection between the computing device and the system;

extracting, by the one or more hardware processors, at least an entity identifier from the heartbeat message, the entity identifier identifying a member of a social networking service and associated with the received heartbeat message;

extracting, by the one or more hardware processors, a first timestamp from the heartbeat message received from the instant messaging application executing at the computing device, the first timestamp indicating a time when the heartbeat message was sent by the computing device;

generating, by the one or more hardware processors, a delayed trigger for determining whether a status of the member is to be changed from online to offline, the delayed trigger having an execution time derived as the sum of time indicated by the extracted first timestamp, the predetermined time interval, and a delay threshold;

executing, by the one or more hardware processors, the delayed trigger in response to a determination that the execution time for the delayed trigger has been reached; and publishing, by the one or more hardware processors, an online status of the member in response to the execution of the delayed trigger, wherein publishing the online status of the member includes communicating the online status of the member to one or more computing devices of other members of the online social networking service.

7. The method of claim 6, further comprising:
executing the delayed trigger by querying an entity database to determine whether the entity database includes an entry corresponding to the entity identifier; and
based on the determination in response to the query, publishing the online status of the member.

8. The method of claim 6, further comprising:
comparing the first timestamp with a second timestamp, wherein:
the second timestamp indicates a time when a previous heartbeat message was sent; and
the previous heartbeat message is associated with the member associated with the received heartbeat message; and
based on the comparison of the first timestamp with the second timestamp, publishing the online status of the member.

9. The method of claim 6, further comprising:
storing the extracted first timestamp in an entity database comprising at least one entry corresponding to the entity identifier; and
publishing an offline status of the member in response to a determination that the extracted first timestamp has expired.

10. The method of claim 6, further comprising:
after determining that the computing device has maintained a persistent connection with the system for some predetermined duration of time, communicating a message to the client device instructing the client device to change a predetermined time interval at which one or more heartbeat messages are to be communicated by the client device.

11. A machine-readable storage device comprising computer-executable instructions stored thereon that, when executed by one or more hardware processors, cause a system to perform a plurality of operations comprising:
receiving a heartbeat message from an instant messaging application executing at a computing device, the heartbeat message communicated from the computing device to the system at a predetermined time interval that is dynamically determined by the system based on a characteristic of a network connection between the computing device and the system;
extracting an entity identifier from the heartbeat message, the entity identifier identifying a member of a social networking service and associated with the received heartbeat message;
extracting a first timestamp from the heartbeat message received from the instant messaging application executing at the computing device, the first timestamp indicating a time when the heartbeat message was sent by the computing device;
generating a delayed trigger for determining whether a status of the member is to be changed from online to offline, the delayed trigger having an execution time derived as the sum of time indicated by the extracted first timestamp, the predetermined time interval, and a delay threshold;
executing the delayed trigger in response to a determination that the execution time for the delayed trigger has been reached; and
publishing an online status of the member in response to the execution of the delayed trigger, wherein publishing the online status of the member includes communicating the online status of the member to one or more computing devices of other members of the online social networking service.

12. The machine-readable storage device of claim 11, wherein the plurality of operations further comprise:
querying an entity database to determine whether the entity database comprises an entry corresponding to the entity identifier; and
based on the determination in response to the query, publishing the online status of the member.

13. The machine-readable storage device of claim 11, wherein the plurality of operations further comprise:
comparing the first timestamp with a second timestamp, wherein:
the second timestamp indicates a time when a previous heartbeat message was sent; and
the previous heartbeat message is associated with the member associated with the received heartbeat message; and
based on the comparison of the first timestamp with the second timestamp, publishing the online status of the member.

14. The machine-readable storage device of claim 11, wherein, after determining that the computing device has maintained a persistent connection for some duration of time, the plurality of operations further comprise:
communicating a message to the computing device instructing the computing device to change a predetermined time interval at which one or more heartbeat messages are to be communicated by the computing device.

* * * * *

UNITED STATES PATENT AND TRADEMARK OFFICE
CERTIFICATE OF CORRECTION

PATENT NO. : 11,076,009 B2
APPLICATION NO. : 15/959468
DATED : July 27, 2021
INVENTOR(S) : Gupta et al.

Page 1 of 1

It is certified that error appears in the above-identified patent and that said Letters Patent is hereby corrected as shown below:

In the Claims

In Column 21, Line 57, in Claim 1, before "machine-readable", insert --a--

In Column 22, Line 17, in Claim 1, delete "threshold:" and insert --threshold;-- therefor In Column 22, Line 54, in Claim 5, delete "claim 4," and insert --claim 1,-- therefor In Column 23, Line 20, in Claim 6, delete "threshold:" and insert --threshold;-- therefor Signed and Sealed this
Thirtieth Day of November, 2021

Drew Hirshfeld
*Performing the Functions and Duties of the*
*Under Secretary of Commerce for Intellectual Property and*
*Director of the United States Patent and Trademark Office*